(12) United States Patent
Guthrie

(10) Patent No.: US 7,114,536 B2
(45) Date of Patent: Oct. 3, 2006

(54) FUNNEL HAVING A HOSE WITH POSITIONABLE RIGIDITY

(76) Inventor: Alan Guthrie, 215 Ridge Rd., Tyrone, GA (US) 30290

(*) Notice: Subject to any disclaimer, the term of this patent is extended or adjusted under 35 U.S.C. 154(b) by 0 days.

(21) Appl. No.: 10/819,529

(22) Filed: Apr. 7, 2004

(65) Prior Publication Data
US 2005/0224138 A1  Oct. 13, 2005

(51) Int. Cl.
*B65B 39/00* (2006.01)
(52) U.S. Cl. ............... 141/337; 141/331; 141/343
(58) Field of Classification Search ........... 141/1, 141/2, 331, 335–338, 343–345; 285/381.1, 285/381.4; 138/118–121; 222/529, 568
See application file for complete search history.

(56) References Cited

U.S. PATENT DOCUMENTS

| | | | |
|---|---|---|---|
| 1,255,577 A * | 2/1918 | Berry | 285/107 |
| 2,578,184 A * | 12/1951 | Green | 220/86.2 |
| 3,899,012 A * | 8/1975 | Sather | 141/331 |
| 3,929,164 A | 12/1975 | Richter | |
| 5,350,091 A * | 9/1994 | Leete et al. | 222/529 |
| 5,566,989 A | 10/1996 | Boing et al. | |
| 5,692,620 A | 12/1997 | Christensen | |
| 5,997,047 A | 12/1999 | Pimentel et al. | |
| 6,164,570 A * | 12/2000 | Smeltzer | 239/588 |
| 6,223,793 B1 * | 5/2001 | Donoughe et al. | 141/338 |
| 6,648,376 B1 | 11/2003 | Christianson | |
| 2003/0184086 A1 | 10/2003 | Christianson | |

* cited by examiner

*Primary Examiner*—Timothy L. Maust
(74) *Attorney, Agent, or Firm*—Ashish Patel, Esq.; Joel Myers, Esq.; Myers & Kaplan, LLC

(57) ABSTRACT

A funnel having a hose with positionable rigidity, wherein the structural configuration of the hose may be selectively positionably manipulated for facilitating the introduction, guidance and maneuverability of same through, between and/or around the parameters, boundaries and/or obstacles presented within a spatially-constrained work space, and wherein the funnel and communicating hose of the present invention may be configurationally manipulated to prevent or minimize undesirable drainage or leakage of residual liquid therefrom following a fluid transfer process. Also disclosed is a method of use of the apparatus of the present invention.

12 Claims, 4 Drawing Sheets

FUNNEL HAVING A HOSE WITH POSITIONABLE RIGIDITY

TECHNICAL FIELD

The present invention relates generally to fluid transfer assemblies, and more specifically to a funnel having a hose with positionable rigidity. The present invention is particularly advantageous for its ability to provide a fluid transfer assembly for adapting to and maintaining a positionably manipulated configuration for facilitating the introduction, guidance and maneuverability of same through, between and/or around the parameters, boundaries and/or obstacles presented within a spatially-constrained work space.

BACKGROUND OF THE INVENTION

Funnels are commonly utilized to catch and direct the downward or gravitational flow of fluid from one container into another—such as in the instance of transferring motor oil from an oil container into the oil reservoir of a vehicle. Although in many circumstances the fluid receiving aperture of a selected reservoir or container is readily accessible, and therefore, enables the direct engagement of the funnel therewith, in various other applications, the fluid-receiving containers or reservoirs may be deeply recessed within and/or reside behind structural obstacles (i.e., such as within spatially-constrained engine compartments, large machinery, and the like) that prevent the direct engagement of a funnel to the fluid receiving apertures thereof.

Accordingly, conventional practice typically dictates the employ of an elongated flexible tube, wherein the proximal end of the tube is securely engaged to the spout of the funnel, and wherein the length of tubing is fed through or worked around the structural obstacles in an attempt to insert the distal end of the tube into the fluid receiving aperture of a deeply-recessed or obscured container; thus, permitting the conveyance or funneling of fluid therethrough. To facilitate such fluid transfer practices, many applicable flexible tubes are often manufactured from corrugated or pleated and expandable plastic tubing, simple rubber tubing, and/or flexible metal conduit. Unfortunately, however, each such type of tubing share inherent disadvantages that render application of same highly impractical, messy, and ineffective.

For instance, although corrugated and expandable plastic tubing possesses the requisite flexibility for facilitating the positionable manipulation of same, such tubing, and the thin plastic material from which such tubing is typically manufactured, characteristically comprises an inherently high degree of resiliency or memory. As a result, such resilient tubing will not hold or maintain a desired positionably manipulated configuration absent a continuous manual force applied or exerted thereover. That is, such tubing does not provide the user with precise positionable rigidity, but instead, attempts to resume a substantially, and naturally, colinear or columnar configuration. Accordingly, when such tubing is being utilized to gain access and funnel liquids into deeply recessed and/or obscured containers, attempting to successfully feed or work the positionably manipulated length of tubing through and/or around structural obstacles within a work space can be largely difficult, as the users hands and arms will likely not fit in or through an already spatially-constrained work space. As such, without a continuous manual force applied or exerted over the tube to maintain a desired positionably manipulated configuration of same, the tube will resiliently return to its original columnar configuration, thereby retarding, hindering or preventing access to the recessed/obscured container. Unfortunately, tubing manufactured from rubber and/or metal conduit share similar disadvantages.

Metal conduit is further notorious for long-term or latent disadvantages that surface through frequent use of same. Specifically, although metal conduit provides a certain degree of resiliency or memory, regular and repeated shaping, bending and overall positional manipulation of the conduit results in structural degradation about the stress points (i.e., areas repeatedly bent or shaped) of the tubing. Consequently, a plurality of fissures or cracks develop through the length of the metal conduit, thus subjecting the conduit to potential breakage, and further resulting in leakage of fluid through the fissures during use and application of the conduit.

Yet another disadvantage commonly associated with fluid transfer assemblies incorporating such flexible and resilient tubing is that during and/or upon resilient return of the tube into a naturally columnar configuration, or during sag of the tube, residual liquid within the tubing tends to drain or leak from the distal end thereof, thereby soiling surrounding surface areas. Additionally, following completion of the fluid transfer process, the funnel engaged to the proximal end of the tube is often laid down or rested on its side and, as such, residual liquid from within the funnel and/or tube tends to leak or spill therefrom; thus, similarly soiling surrounding surface areas. Unfortunately, available funnel-based fluid transferring assemblies do not provide a means for preventing such undesirable drainage or leakage of residual liquid therefrom.

Therefore, it is readily apparent that there is a need for a funnel having a hose with positionable rigidity, wherein the hose may be regularly and repeatedly shaped, bent, twisted, or otherwise structurally configured or arranged to maintain a hands-free positionably manipulated configuration for facilitating the introduction, guidance and maneuverability of same through, between and/or around the parameters, boundaries and/or obstacles presented within a spatially-constrained work space. There is a further need for such a fluid transfer assembly that provides a flexible hose that may be regularly and repeatedly configurationally manipulated without risk of structural degradation about the stress points thereof. There is still a further need for such a fluid transfer assembly that may be configurationally manipulated to prevent undesirable drainage or leakage of residual liquid from the funnel and/or communicating hose prior to and/or following completion of the fluid transfer process.

BRIEF SUMMARY OF THE INVENTION

Briefly described, in a preferred embodiment, the present invention overcomes the above-mentioned disadvantages and meets the recognized need for such a device by providing a funnel having a hose with positionable rigidity, wherein the structural configuration of the hose may be selectively positionably manipulated for facilitating the introduction, guidance and maneuverability of same through, between and/or around the parameters, boundaries and/or obstacles presented within a spatially-constrained work space, and wherein the funnel and communicating hose of the present invention may be configurationally manipulated to prevent undesirable drainage or leakage of residual liquid therefrom.

According to its major aspects and broadly stated, the present invention in its preferred form is a funnel having a hose with positionable rigidity, wherein the present invention comprises, in general, a funnel in secured and fluid communication with a hose formed from a plurality of ball-and-socket elements.

More specifically, the present invention is a funnel having a hose with positionable rigidity, wherein the present invention comprises an approximately conically-shaped funnel in pivotal and fluid communication with a hose via a ball-shaped adapter comprising a throughhole or channel formed therethrough. Preferably, the hose is formed from a plurality of ball-and-socket elements, wherein each such element preferably comprises a throughhole or channel formed therethrough. Preferably each element comprises a ball portion and a socket portion, wherein the ball portion of a first element is preferably received via frictional fit within a succeeding socket of a second element, and so on, as is known within the art, to form a length of leak-proof tubing or hose. Due to the frictional fit between the ball and socket portions of adjacently-disposed elements, the hose is preferably adapted to rigidly maintain any selected configuration to which it is shaped or adapted. Additionally, each ball-and-socket element may be rotationally and pivotally manipulated relative to adjoining elements; thereby, further facilitating the selective positional or configurational manipulation of same. The present invention further provides a valve for controlling the flow of liquid from the funnel through the communicating hose.

Preferably, prior to and/or following completion of the fluid transfer process, the hose of the present invention may preferably be coiled or otherwise configurationally manipulated to form a stable support base therewith, wherein the distal end thereof may preferably be brought into an approximately upright position, and wherein the funnel pivotally connected to the proximal end of the tube may be similarly pivotally manipulated to be brought into an approximately upright position, thus preventing undesirable drainage or leakage of residual liquid from the funnel and/or distal end of the communicating hose.

Accordingly, a feature and advantage of the present invention is its ability to maintain a hands-free positionably manipulated configuration for facilitating the introduction, guidance and maneuverability of same through, between and/or around the parameters, boundaries and/or obstacles presented within a spatially-constrained work space.

Another feature and advantage of the present invention is its ability to provide a fluid transfer assembly that may be configurationally manipulated to prevent undesirable drainage or leakage of residual liquid from the funnel and/or communicating hose during and/or following completion of the fluid transfer process.

Still another feature and advantage of the present invention is its pivotally adjustable funnel.

Still yet another feature and advantage of the present invention is its ability to provide a funnel having a hose with positionable rigidity, wherein a conveniently incorporated valve may be utilized to control the flow of fluid from the funnel through the communicating hose.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

In describing the preferred and selected alternate embodiments of the present invention, as illustrated in FIGS. 1–4, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
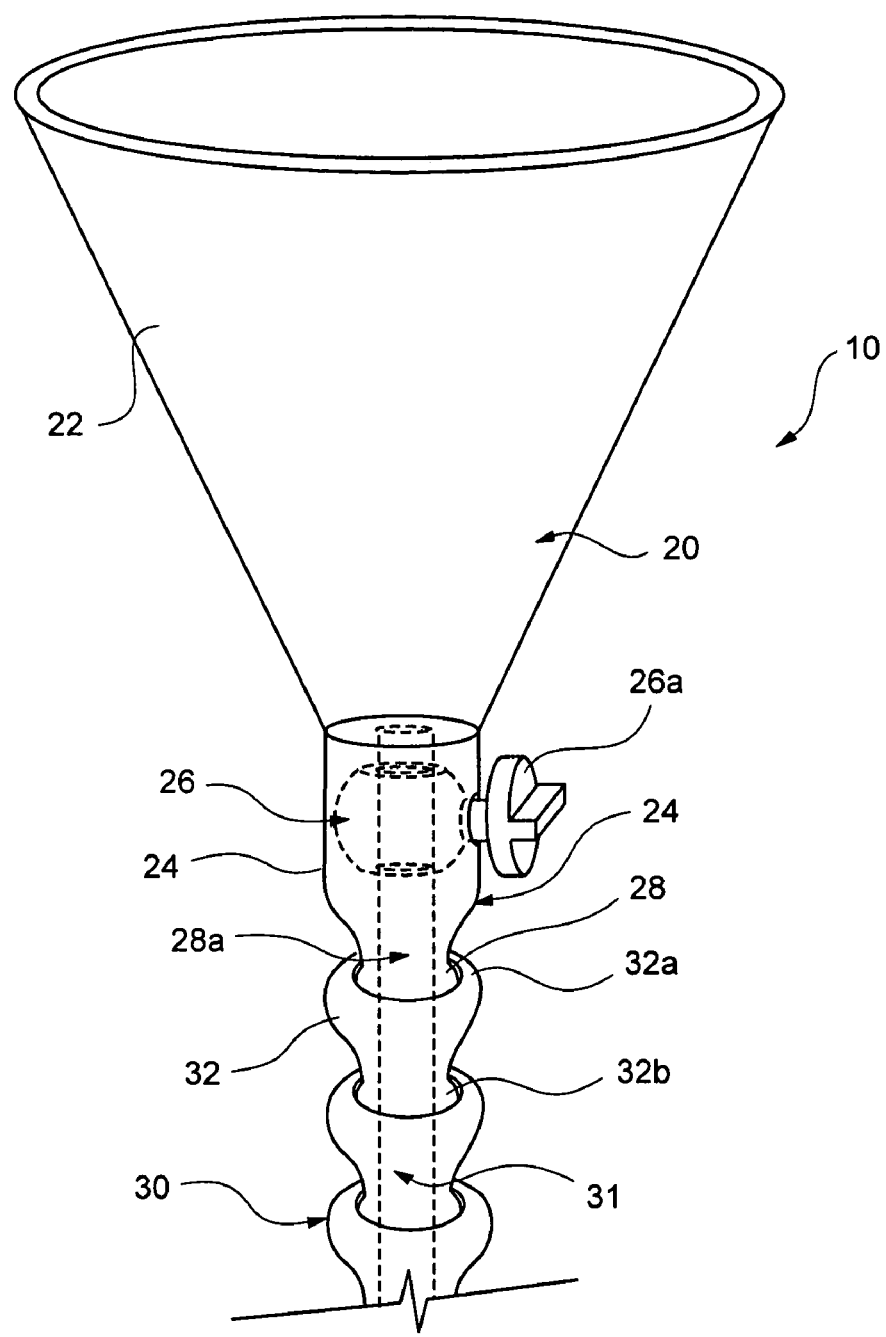
FIG. 1 is a perspective view of a funnel having a hose with positionable rigidity according to a preferred embodiment of the present invention.

Referring now to FIG. 1, the present invention in a preferred embodiment is an apparatus 10 comprising funnel 20 in fluid communication with hose 30.

Funnel 20 is preferably approximately conically-shaped, and comprises upper fluid catching or receiving portion 22 and lower spout portion 24, as is known within the art. Funnel 20 is preferably formed from a suitable plastic substrate; although other suitable substrates may be utilized, such as, for exemplary purposes only, metal. Preferably disposed within spout portion 24 of funnel 20 is ball valve 26, wherein ball valve 26 is preferably actuated via communicating valve knob or lever 26a to control the flow or passage of liquid from receiving portion 22 of funnel 20 through spout portion 24, and through communicating hose 30. Although the present invention preferably incorporates ball valve 26, it should be recognized that any other suitable valve system may be utilized to control the flow of fluid from funnel 20 through hose 30.

Preferably, funnel 20 is in pivotal and fluid communication with hose 30 via ball-shaped adapter 28, wherein adapter 28 comprises throughhole or channel 28a formed therethrough and in general fluid communication with funnel 20. Adapter 28 is preferably part of a system of ball-and-socket elements 32 that compose hose 30. Specifically, hose 30 is formed from a plurality of such ball-and-socket elements 32, wherein each such element 32 preferably comprises a throughhole or channel 31 formed therethrough and in general fluid communication with channel(s) 31 of the preceding and/or succeeding ball-and-socket element 32. Preferably ball-and-socket elements 32 are preferably formed from a suitable plastic substrate; although other suitable substrates may be utilized, such as, for exemplary purposes only, metal.

Preferably, each element 32 comprises a socket portion 32a and a ball portion 32b, wherein ball portion 32b of a first element 32 is preferably received via frictional fit within a succeeding socket portion 32a of a second element 32, and so on, as is known within the art, to form a length of leak-proof tubing or hose 30. Due to the frictional fit between ball portion 32b and socket portion 32a of adjacently-disposed elements 32, hose 30 is preferably adapted to rigidly maintain any selected configuration to which it is shaped—preferably within the limits of design and functional parameters of elements 32. Additionally, each ball-and-socket element 32 may be rotationally and pivotally manipulated relative to adjoining elements 32; thereby, further facilitating the selective positional or configurational manipulation of same. It should be recognized that each socket portion 32a and/or ball portion 32b may comprise internally and/or externally disposed stops, cylinders, or other means adapted to prevent hose 30 from over-bending, and, thus, separating upon dislodgment of a ball portion 32b from a socket portion 32a of adjacently-disposed ball-and-socket elements 32.

Figure 2:
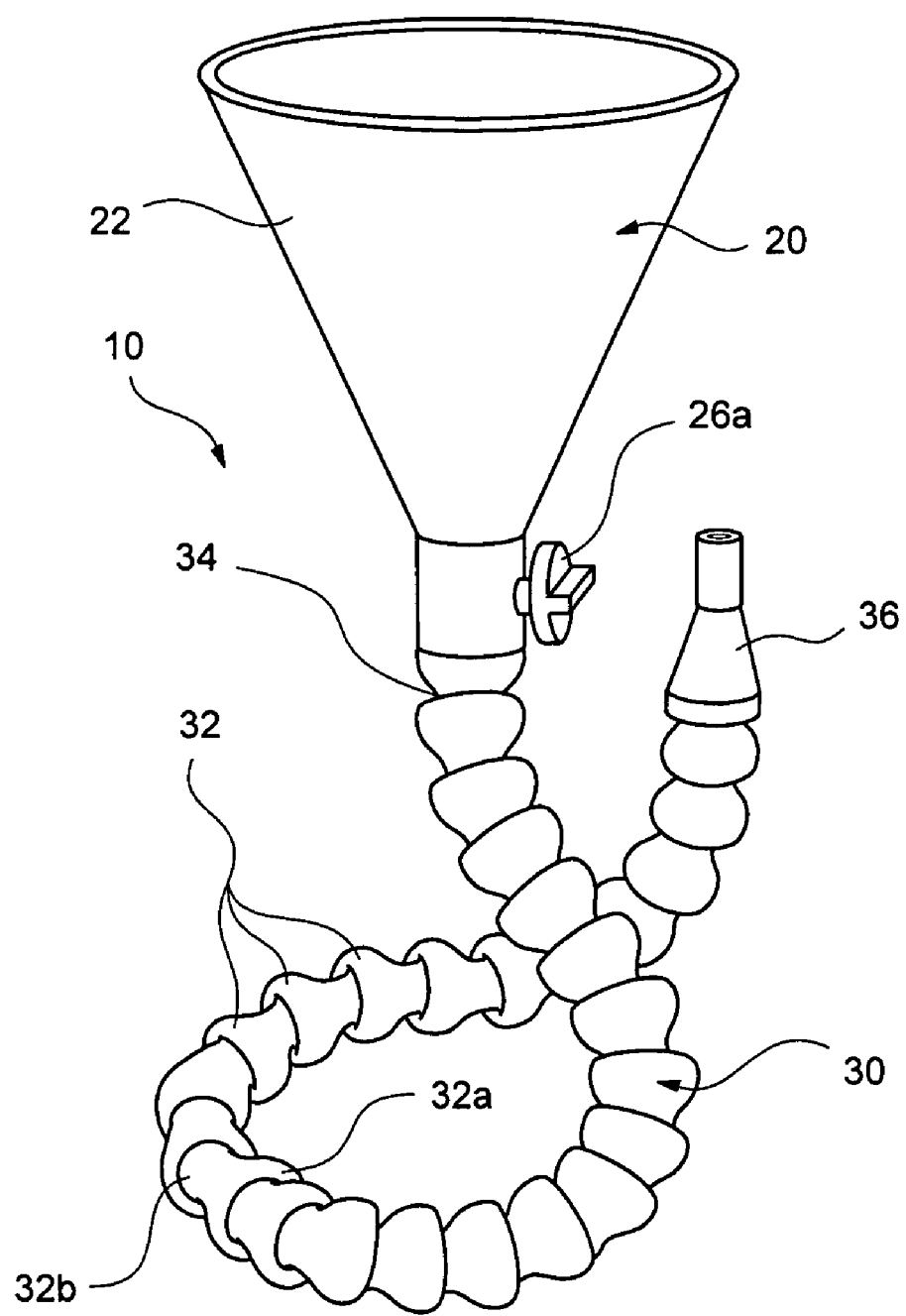
FIG. 2 is a perspective view of a funnel having a hose with positionable rigidity according to a preferred embodiment of the present invention, shown in use.
Figure 3:
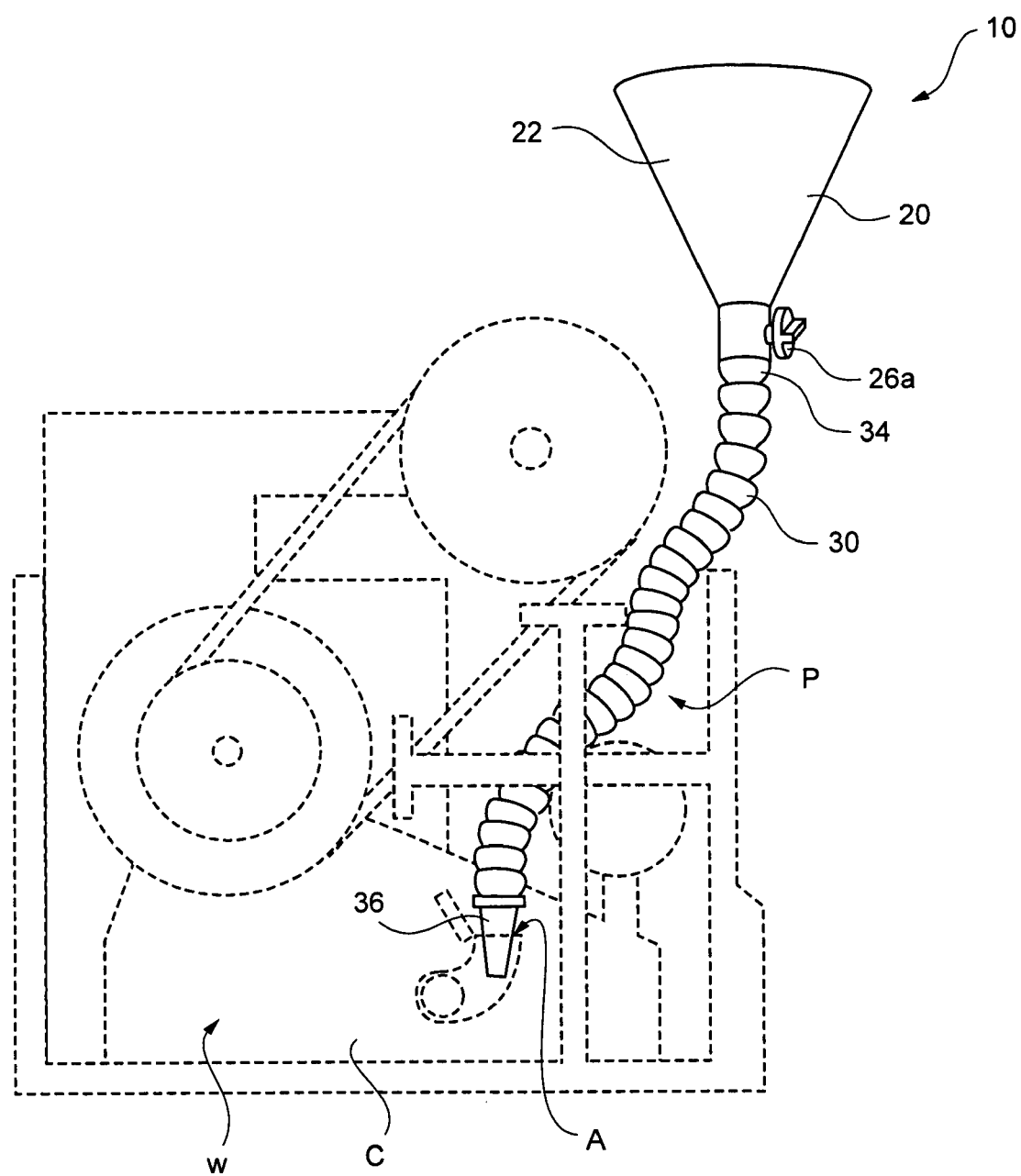
FIG. 3 is a perspective view of a funnel having a hose with positionable rigidity according to a preferred embodiment of the present invention, shown in use; and, FIG. 4 is a perspective view of a funnel having a hose with positionable rigidity according to an alternate embodiment of the present invention.

Referring now more specifically to FIGS. 2–3, in use, hose 30 of apparatus 10 is preferably positionally or configurationally manipulated to approximately mimic the boundaries or spatial parameters P of a confined or spatially-constrained work space W. Alternatively, hose 30 may be dynamically configured to the spatial parameters P of work space W during insertion of hose 30 therethrough. Thereafter, hose 30 is preferably introduced, guided and maneuvered through the spatial parameters P of work space W, and between and/or around obstacles O within work space W to preferably access or engage a fluid receiving aperture A of a deeply-recessed or obscured reservoir or container C within work space W. Upon inserting distal end 36 of hose 30 into fluid receiving aperture A of container C, funnel 20 is preferably pivotally adjusted to maintain a substantially upright position (i.e., relative to a ground surface), wherein upper receiving portion 22 thereafter receives a selected fluid, and wherein ball valve 26 disposed within spout portion 24 of funnel 20 is preferably maintained within an initially closed position.

Subsequently, ball valve 26 is preferably opened or actuated via valve knob 26a to permit the controlled flow or passage of the selected fluid from receiving portion 22 of funnel 20 through spout portion 24, through ball valve 26, through ball-shaped adapter 28, through each ball-and-socket element 32 of hose 30, through distal end 36 of hose 30, and into container C, wherein ball valve 26 subsequently may be closed via valve knob 26a at any user-selected time period during the fluid transfer process.

Upon final closure of ball valve 26, and while maintaining hose 30 within the confines or spatial parameters P of work space 30, a user preferably grasps hose 30 about proximal end 34 thereof (or at any other suitable section of hose 30), and preferably twists, rotates, or otherwise manipulates ball-and-socket elements 32 thereabout until distal end 36 of hose 30 is brought into an approximately upright position, or into any other position that prevents or minimizes leakage or drainage of residual fluid from distal end 36 upon extraction of hose 30 from work piece W.

As best illustrated in FIG. 3, preferably prior to and/or following completion of the fluid transfer process, hose 30 of apparatus 10 may preferably be coiled or otherwise configurationally manipulated to form a stable support base therewith, wherein distal end 36 thereof may preferably be brought into an approximately upright position, and wherein funnel 20 may be similarly pivotally manipulated, via ball-shaped adapter 28, to be brought into an approximately upright position; thus, preventing or minimizing undesirable drainage or leakage of residual liquid from funnel 20 and/or distal end 36 of hose 30.

Figure 4:
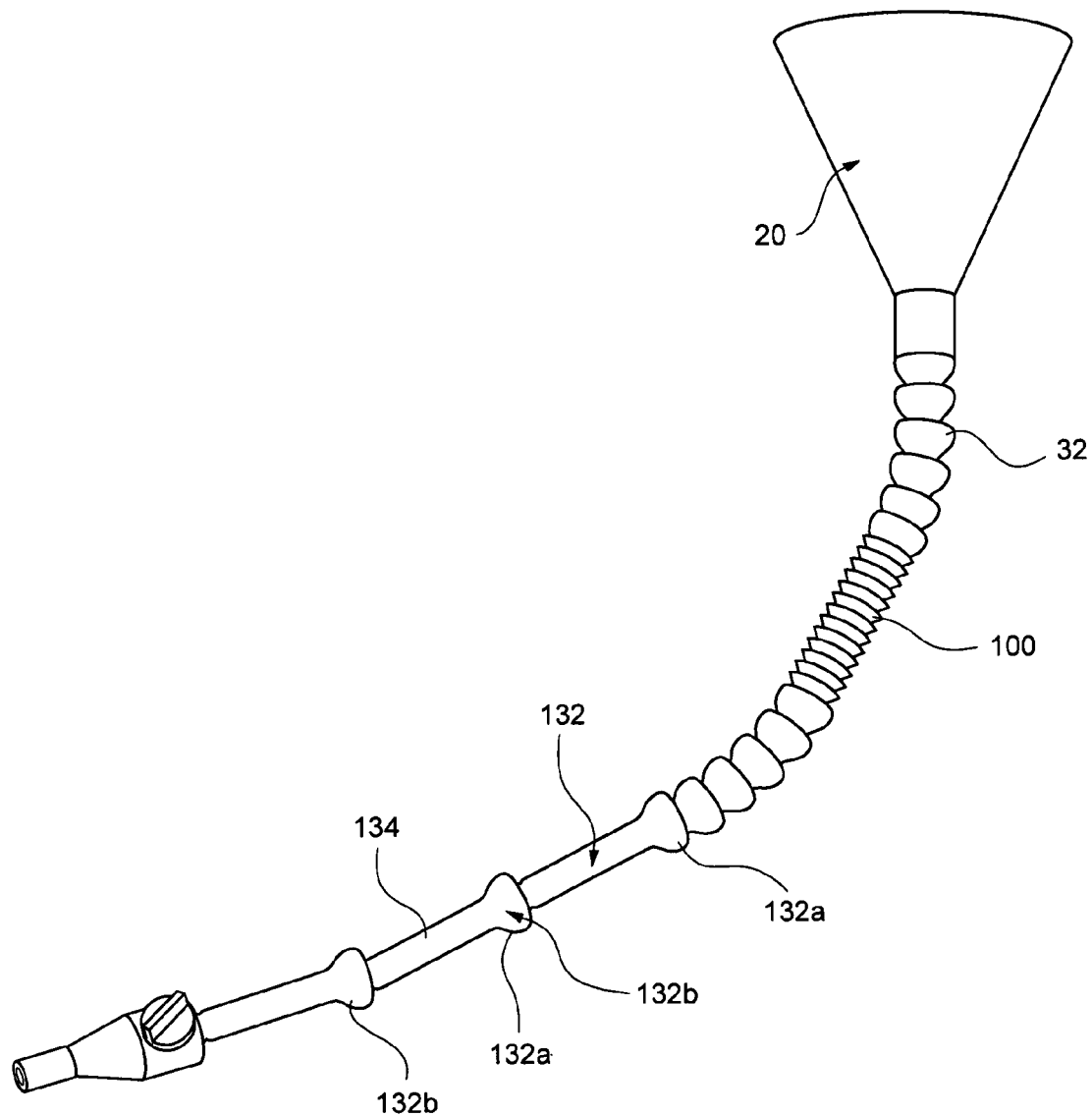

Referring now more specifically to FIG. 4, illustrated therein is an alternate embodiment of apparatus 10, wherein the alternate embodiment of FIG. 4 is substantially equivalent in form and function to that of the preferred embodiment detailed and illustrated in FIGS. 1–3 except as hereinafter specifically referenced. Specifically, the embodiment of FIG. 4 incorporates sections of corrugated or pleated and expandable tubing 100 and sections of ball-and-socket elements 132, wherein socket portions 132a and ball portions 132b of ball-and-socket elements 132 are separated by an elongated rigid neck portion 134. It should be recognized that the present alternate embodiment may be modified to incorporate either tubing 100 or ball-and-socket elements 132.

It is contemplated in another alternate embodiment that a ball valve may be incorporated into distal end 36 of hose 30 in lieu of, or in conjunction with, ball valve 26.

It is contemplated in still another alternate embodiment that hose 30 could incorporate telescopically adjustable segments or sections.

It is contemplated in yet another alternate embodiment that hose 30 could removably receive segments or sections of ball-and-socket elements 32 in order to selectively manipulate the length of hose 30.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A fluid transferring apparatus, comprising:
a funnel in fluid communication with a hose, said hose comprising a plurality of ball-and-socket elements adapted to impart said hose with positionable rigidity, wherein said funnel is pivotally engaged to said hose via a ball element of said plurality of ball-and-socket elements; and, a valve for controlling the flow of fluid through said apparatus, said valve engaged with said funnel, wherein said valve comprises an aperture, and wherein alignment of said aperture with an aperture of said funnel enables fluid to flow from said funnel, through said valve, and through said hose, and
wherein said funnel comprises an open-mouth structure exposed to ambient environment and, thus, atmospheric pressure, and wherein said open-mouth structure of said funnel catches a gravitationally or downwardly fed fluid flow from a container or fluid source disposed independent thereof.

2. The apparatus of claim 1, wherein said ball-and-socket elements each comprise a ball portion and a socket portion.

3. The apparatus of claim 2, wherein said ball portion of each said ball-and-socket element is engaged via frictional fit to said socket portion of an adjacently-disposed said ball-and-socket element.

4. The apparatus of claim 3, wherein each said ball-and-socket element is rotationally and pivotally manipulatable relative to adjoining said ball-and-socket elements, thereby facilitating the selective positional or configurational manipulation of said hose.

5. The apparatus of claim 4, wherein said hose further comprises at least one section of corrugated tubing.

6. The apparatus of claim 4, wherein said ball portion and said socket portion of each said ball-and-socket element is separated by an elongated neck portion.

7. A fluid transferring apparatus, comprising:
a funnel in fluid communication with a hose, said hose comprising a plurality of ball-and-socket elements adapted to impart said hose with positionable rigidity, wherein said funnel is pivotally engaged to said hose via a ball element of of said plurality of ball-and-socket element, and,
a valve for regulating the flow of fluid through said apparatus, wherein said valve comprises an aperture, and where placement of said aperture in fluid communication with said funnel enables fluid to flow from said funnel through said hose, and
wherein said funnel comprises an open-mouth structure exposed to ambient environment and, thus, atmospheric pressure, and wherein said open-mouth structure of said funnel catches a gravitationally or downwardly fed fluid flow from a container or fluid source disposed independent thereof.

8. The apparatus of claim 7, wherein said ball-and-socket elements each comprise a ball portion and a socket portion.

9. The apparatus of claim 8, wherein said ball portion of each said ball-and-socket element is engaged via frictional fit to said socket portion of an adjacently-disposed said ball-and-socket element.

10. The apparatus of claim 9, wherein each said ball-and-socket element is rotationally and pivotally manipulatable relative to adjoining said ball-and-socket elements, thereby facilitating the selective positional or configurational manipulation of said hose.

11. The apparatus of claim 10, wherein said hose further comprises at least one section of corrugated tubing.

12. The apparatus of claim 10, wherein said ball portion and said socket portion of each said ball-and-socket element is separated by an elongated neck portion.

* * * * *